United States Patent [19]

Lee et al.

[11] Patent Number: 5,585,432
[45] Date of Patent: Dec. 17, 1996

[54] FLOW FORMABLE COMPOSITES HAVING POLYMODAL FIBER DISTRIBUTIONS

[75] Inventors: Walter J. Lee, Lausanne, Switzerland; Scott M. Davis, Pittsfield, Mass.; Barbara E. Kaler, Cambridge, Mass.; Daniel R. Arick, Williamstown, Mass.

[73] Assignee: General Electric Company, Pittsfield, Mass.

[21] Appl. No.: 138,512

[22] Filed: Oct. 15, 1993

[51] Int. Cl.$^6$ .................................................. C08K 3/40
[52] U.S. Cl. .................... 524/494; 524/496; 428/325; 428/327; 428/332; 428/338; 428/212; 264/109; 264/128; 162/145; 162/149; 162/156; 162/168.1
[58] Field of Search ...................... 524/494, 496; 428/325, 327, 332, 338, 212; 264/109, 128; 162/145, 149, 156, 168.1

[56] References Cited

U.S. PATENT DOCUMENTS

| | | | |
|---|---|---|---|
| 3,716,449 | 2/1973 | Gatward et al. | 162/101 |
| 4,044,188 | 8/1977 | Segel | 428/283 |
| 4,056,501 | 11/1977 | Gibbs et al. | 260/29.6 |
| 4,323,531 | 4/1982 | Bradley et al. | 264/113 |
| 4,426,470 | 1/1984 | Wessling et al. | 524/35 |
| 5,275,776 | 2/1994 | Hara et al. | 264/257 |

FOREIGN PATENT DOCUMENTS

| | | |
|---|---|---|
| 0148760 | 7/1985 | European Pat. Off. . |
| 0148761 | 7/1985 | European Pat. Off. . |

*Primary Examiner*—W. Robinson H. Clark

[57] ABSTRACT

Reinforced polymer composites having a uniform mixture of reinforcing fibers having a polymodal length distribution and having polymer particulates are provided exhibiting a good balance of impact strength and processability/formability. The composites are prepared by forming a dilute aqueous slurry of a solid heat-fusible organic polymer and a reinforcing material having a polymodal length distribution, agitating the slurry and then dewatering the slurry to provide a mat of thermoplastic polymer particles and reinforcing fiber. The mat is dried and then stamped under pressure and heat to consolidate the thermoplastic material and form a sheet-like composite structure.

5 Claims, No Drawings

FLOW FORMABLE COMPOSITES HAVING POLYMODAL FIBER DISTRIBUTIONS

BACKGROUND OF THE INVENTION

1. Field of Invention

The present invention relates to fiber reinforced thermoplastic composites, and more particularly relates to thermoplastic composites having reinforcing fibers which have a polymodal distribution.

2. Description of the Related Art

Aqueous methods of making fiber reinforced composite materials from an aqueous slurry of, solid polymer and reinforcing material are known. See Published European Patent Applications 0,148,760 and 0,148,761, Wessling et al., U.S. Pat. No. 4,426,470 issued Jan. 17, 1984 and Gatward et al., U.S. Pat. No. 3,716,449 issued Feb. 13, 1973, all of which are incorporated herein by reference. In general these reinforced polymer composites have a uniform mixture of fiber, polymer and optionally binder and are prepared by performing dilute aqueous slurries of a solid heat-fusible organic polymer, a reinforcing material and optionally a latex binder.

Reinforcing materials disclosed have included organic and inorganic products such as graphite, metal fibers, aromatic polyamides, cellulose and polyolefin fibers, and typically have included glass fibers such as chopped glass strands having a length of ⅛ to 1 inch (about 3.2 to 25.4 mm) or milled glass fibers which generally have a length of about 1/32 to ⅛ inch (about 0.79 to 3.2 mm). These reinforcing fibers have typically involved unimodal fiber distributions resulting in the final composite article after having been stamped under high pressures and at elevated temperatures exhibiting a relatively low impact strength if short fibers are employed exclusively, and exhibiting an undesirably high resistance to flow during stamping at elevated temperatures if relatively long fibers are used exclusively.

Accordingly, there is a need for thermoplastic composites and processes for the making thereof, which result in thermoplastic sheet-like structures which exhibit desired levels of flow during stamping at elevated temperatures and pressures, and which exhibit desired levels of impact strength in the final composite article.

SUMMARY OF THE INVENTION

This invention provides a process for making reinforced thermoplastic composites which comprises forming a dilute aqueous slurry of a solid, water-insoluble, heat-fusible organic polymer in particulate form and a reinforcing material having a polymodal length distribution, collecting the solids in the form of a continuous sheet or mat, dewatering, drying and stamping at an elevated temperature and pressure.

The invention also provides reinforced thermoplastic composites comprising a thermoplastic matrix material and a reinforcing material having a polymodal fiber length distribution. When prepared by the process of this invention, these composites exhibit desired levels of impact strength in the final article and desired levels of processability/flowability during the stamping step.

DETAILED DESCRIPTION OF THE INVENTION

The process of this invention involves (1) an aqueous medium, preferably (2) a binder, usually at least partially in the form of a latex which contains either anionic or cationic bound charges, (3) a heat-fusible organic polymer which is in particulate form, (4) reinforcing fibers having a polymodal fiber length distribution, and (5) optionally a flocculent.

In the process, a dilute aqueous slurry is prepared containing the heat fusible organic polymer particulates and the reinforcing fibers. The slurry is agitated and then uniformly distributed onto a porous support and is allowed to drain to form a wet mat, the wet mat is optionally passed through press rolls and then dried, such as passing the wet mat through a series of heated dryer rolls to obtain a dried mat which optionally is rolled onto a cylinder or collected as a flat sheet stock. The dried mat may then be subjected to various kinds of treatment for the intended use such as compression molding the dried mat into articles. Optionally, a binder material is employed in the dilute aqueous slurry and the solids are flocculated during agitation with a polymeric flocculent having an opposite charge to that of the latex binder. Suitable binders and flocculents are set forth in Wessling etal., U.S. Pat. No. 4,426,470 issued Jan, 17, 1984 which is incorporated herein by reference. Suitable latexes which can be used in the present invention include those described in U.S. Pat. No. 4,056,501, issued Nov. 1, 1977, to Gibbs et al., incorporated herein by reference.

The invention requires a normally solid, heat fusible organic polymer. By "heat fusible" is meant that the polymer particles are capable of deformation under heat to join into an unitary structure. The heat fusible polymers may be either thermoplastic or thermoset resins. The heat fusible organic polymer component of the present invention is desirably a hydrophobic, water-insoluble addition polymer. These polymers are in particulate form and may be in the form of a powder or a dispersion. Suitable heat fusible organic polymers include addition and condensation polymers such as, for example, polyethylene; ultra high molecular weight polyethylene; chlorinated polyethylene; bipolymers of ethylene and acrylic acid; polypropylene; nylons; phenylene oxide resins; phenylene sulfide resins; polyoxymethylenes; polyesters; terpolymers of acrylonitrile, butadiene and styrene; polyvinylchloride; bipolymers of a major proportion of vinylidene chloride and a minor proportion of at least one other alpha, beta-ethylenically unsaturated monomer copolymerizable therewith; and styrene homopolymers or copolymers. The polymer particulates generally and advantageously have a particle size in the range of 1 to 400 microns. The polymers are generally employed in an amount of from about 19 to 79 percent by weight of the solids, dry weight basis. A particularly preferred organic polymer is a polyolefin powder when such polymer has been prepared by the process of U.S. Pat. No. 4,323,531. Of course, blends of polymers may be used.

The reinforcement fibers include materials organic and inorganic materials such as graphite, metal fibers, aromatic polyamides, cellulose and polyolefin fibers, but preferably and advantageously comprises glass fibers such as chopped glass strands having a length of ⅛ to 1 inch (about 3.2 to 25.4 mm), milled glass fibers which generally have a length of about 1/32 to ⅛ inch (about 0.79 to 3.2 mm) and mixtures thereof. The glass fibers are advantageously heat cleaned and, to improve impact properties, such fibers may be compatibilized by having a thin coating of, for example a polyolefin resin or starch thereon. The fibers are preferably surface treated with chemical sizing or coupling agents which are well known in the art. The reinforcing material generally comprises from about 10 to about 80 weight percent of the composite.

The reinforcing fiber used in the process and composites of the present invention have a polymodal distribution wherein at least 95% of said fibers have lengths of less than 2 inches, more preferably less than 1.5 inches, and even more preferably less than 1.1 inch. The fibers have a polymodal distribution which means that substantial percentages of the fibers are within a very narrow fiber length bracket or range. The term polymodal is meant to include the term bimodal, and multimodal distributions such as trimodal, quadmodal and quintmodal provided that at least 2 of the fiber groups are present at a level of at least 10 percent by weight based on the total weight of reinforcing fibers in the composite, more preferably at least 20% by weight thereof, and most preferably at least 30% by weight therof. Each fiber group is defined as fibers within a range of 0.1 inches around an average length $L_1$, and the modal group of fibers is defined as those having a length between $L_1 -0.05$ inches and $L_1+0.05$ inches. Preferably, each group of fibers is within a narrower range from the average length for that modal group, for example $L_1-0.02$ inches and $L_1+0.02$ inches. Each of the modal groups has an average length $L_1$ which is at least 0.1 inches different from the other modals or nodes. The polymodal fiber distributions preferably comprise first fibers and second fibers wherein the first fibers are present at a level of at least 10% by weight based on the total weight of said fibers, the first fibers having an average length $L_1$ and consisting of fibers having a length between $L_1-0.02$ inches and $L_1+0.02$ inches, and the second fibers being present at a level of at least 10% by weight based on the total weight of the fibers and having an average length of $L_2$ consisting of fibers having a length between $L_2-0.05$ inches and $L_2+0.05$ inches wherein $L_2$ is larger than $L_1$ by at least 0.1 inches.

Preferably the polymodal distribution is a bimodal distribution wherein $L_1$ is selected from between 0.10 and 0.15 inches and $L_2$ is selected from between 0.40 and 0.60 inches. Preferably the first and second fibers are chopped glass fibers. Preferably the thermoplastic resin is a polypropylene resin. When chopped glass fibers are used having a given average length L, it is understood that the glass fibers for that node will be primarily within the desired node, preferably at least 80% by weight based on the fibers used for that fiber length.

The process for making the final composite formed article involves first forming a web or mat as defined above, followed by heating the mat to a temperature sufficient to melt the thermoplastic material and stamping the consolidated sheet into a final article.

The composites of the invention may also, optionally, contain a variety of other ingredients. Minor amounts, for example, 10–33% by weight, of fillers such as silicon dioxide (Novacite), $CaCO_3$, MgO, $CaSiO_3$ (wollastonite) and mica may be incorporated in the composites of this invention if desired. Pigments or dyes may be added to impart opacity and/or color. Various chemical additives such as antioxidants, UV stablizers, thickeners, foaming agents, anti-foaming agents, bacteriocides, electromagnetic radiation absorption agents, etc., may also be used.

The composites are formed by blending the heat-fusible polymer particulates, the reinforcing material, and the water, agitating to form a slurry, dewatering to form a continuous mat, drying, and applying heat and pressure to the mat to melt the thermoplastic resin and form the sheet-like composite structure which can then be stamped to form the final article.

This method is conveniently and preferably carried out by first stirring the reinforcing material in water until it is uniformly disbursed, then slowly adding the heat-fusible polymer, and stirring the materials throughout this portion of the process. This slurry of water, heat-fusible polymer, reinforcing material and optionally latex binder and flocculent preferably has a total solids content of 0.01 to 5% solids by weight, and more preferably 0.02 to 0.5% solids by weight based on the total weight of the slurry.

The sheet-forming and dewatering process may be accomplished by any conventional paper making apparatus such as a sheet mold or a Fourdrinier or cylinder machines.

After the mat is formed into a dewatered sheet, it may be desirable to densify the sheet by pressing it with a flat press or by sending it through calendering rolls. Densification after drying of the mat is particularly useful for increasing the tensile and tear strength of the mat. Drying of the mat may be either air drying at ambient temperatures or oven drying.

Some resins such as aromatic polycarbonates derived from bisphenol-A and phosgene, having molecular weights in excess of 10,000 exhibit inherently high impact strengths, and thus composites formed thereby may exhibit high impact strengths regardless of whether the lengths of the reinforcing fiber are long or short, and thus may not exhibit an improved property balance between processability/flowability of the mat during stamping, and final impact strength of the resultant composite article when polymodal fiber distributions are employed therein. Some resins, however, such as polypropylene, do exhibit an improvement in impact strength from short fibers such as those of ⅛ inch fiber length when longer fibers such as those of ¼ inch in fiber length are used, and exhibit improved composite viscosity when blends of short fibers, for example ⅛ inch fiber length are combined with longer fiber such as those having ¼ inch in fiber length and ½ inch in fiber length.

EXAMPLES

The invention is further illustrated, but is not limited by the following examples wherein all parts and percentages are by weight unless otherwise specified.

TABLE I

| | | Fiber Length Distributions | | | |
| | | Polypropylene 1 (20 MFI) | | Polypropylene 2 (30 MFI) | |
| Example | Fiber Length (inches) | Composite Viscosity (MPa-s) | Total Glass Wt (%) | Composite Viscosity (MPa-s) | Total Glass Wt (%) |
| --- | --- | --- | --- | --- | --- |
| A | 1 | | | 2.4 | 30 |
| B | ½ | 2.1 | 30 | 1.8 | 30 |
| C | ¼ | 0.68 | 30 | 0.52 | 30 |
| D | ⅛ | | | 0.28 | 30 |
| 1 | 50% ¼ + 50% ⅛ | 0.53 | 30 | | |
| 2 | 25% ½ + 75% ⅛ | 0.79 | 30 | | |

TABLE II

IZOD IMPACT TEST
30% GLASS FIBER REINFORCED POLYPROPYLENE

| EXAMPLE | FIBER LENGTH (IN.) | SAMPLE THICKNESS | NO. OF SAMPLES | NOTCHED IZOD IMPACT (FT.LBS./IN.) | NO. OF SAMPLES | UNNOTCHED IZOD IMPACT (FT.LBS./IN.) |
| --- | --- | --- | --- | --- | --- | --- |
| E | 1 | 0.125 | 9 | 10.91 ± 1.81 | 10 | 18.74 ± 1.49 |
| F | ½ | 0.126 | 8 | 13.20 ± 1.97 | 10 | 20.83 ± 2.54 |
| G | ¼ | 0.123 | 10 | 14.47 ± 2.02 | 8 | 20.92 ± 2.85 |
| H | ⅛ | 0.125 | 10 | 7.00 ± 0.58 | 10 | 11.99 ± 1.73 |

TABLE III

DYNATUP FALLING WEIGHT IMPACT TEST
30% GLASS FIBER REINFORCED POLYPROPYLENE

| EXAMPLE | FIBER LENGTH (IN.) | SAMPLE THICKNESS | NO. OF SAMPLES | PEAK LOAD (LBS.) | ENERGY @ PH LOAD (FT. LBS.) | TOTAL ENERGY (FT. LBS.) |
| --- | --- | --- | --- | --- | --- | --- |
| I | 1 | 0.125 | 4 | 609.56 ± 45.82 | 9.71 ± 1.25 | 20.38 ± 1.22 |
| J | ½ | 0.125 | 4 | 629.99 ± 50.43 | 9.88 ± 0.98 | 21.35 ± 1.19 |
| K | ¼ | 0.125 | 4 | 538.89 ± 49.73 | 8.06 ± 1.67 | 18.07 ± 0.99 |
| L | ⅛ | 0.125 | 4 | 384.40 ± 14.80 | 5.59 ± 0.58 | 12.84 ± 1.49 |

Examples A through L are comparative examples using unimodal fiber distributions. Examples 1 and 2 are examples of the present invention using bimodal fiber distributions. Note that the composite viscosities of the bimodal fiber distribution give a balance of flow between the long and short fiber lengths. It is anticipated that the composites of the present invention will give a desired balance between such properties as composite viscosity and composite impact strength. The average lengths referred to in this application are number average lengths.

Fiber Length Distributions
Polybutylene terephthalate

| Example | Fiber Length (inches) | Composite Viscosity (MPa-s) | Total Glass Wt (%) |
| --- | --- | --- | --- |
| M | ½ | 3.1 | 30 |
| N | ¼ | 1.1 | 30 |
| 3 | 50% ¼ + 50% ⅛ | 0.89 | 30 |
| 4 | 25% ½ + 75% ⅛ | 1.1 | 30 |

We claim:

1. A process for producing a fiber reinforced thermoplastic resin matrix composite article, comprising (a) forming a web comprising reinforcing fibers having a polymodal fiber distribution and comprising thermoplastic particulates;

(b) heating said web to melt said thermoplastic material to form a consolidated sheet; and (c) stamping the sheet under conditions of elevated temperature and pressure to form the article.

2. The process of claim 1 wherein said polymodal distribution is a bimodal distribution.

3. The process of claim 1 wherein said fibers comprise at least 10% by weight first fibers based on the total weight of the web, said first fibers having length from between 0.10 and 0.15 inches, and at least 10% by weight second fibers based on the total weight of the web, said second fiber having lengths of from between 0.40 and 0.60 inches.

4. The process of claim 3 wherein said first and second fibers are glass fibers.

5. The process of claim 1 wherein said web consists essentially of said thermoplastic material and said reinforcing fibers.

* * * * *